United States Patent [19]

Minet

[11] Patent Number: 4,626,643

[45] Date of Patent: Dec. 2, 1986

[54] HEAT SENSOR FOR MEASURING THE TEMPERATURE OF A PRODUCT HEATED IN A MICROWAVE OVEN

[75] Inventor: Michel Minet, Ezanville, France

[73] Assignee: Valeo, Paris, France

[21] Appl. No.: 719,485

[22] Filed: Apr. 3, 1985

[30] Foreign Application Priority Data

Apr. 4, 1984 [FR] France ............... 84 05292

[51] Int. Cl.[4] .............................................. H05B 6/68
[52] U.S. Cl. ...................... 219/10.55 B; 219/10.55 E; 219/10.55 D; 219/516; 374/149; 374/165; 374/208; 338/28; 340/596
[58] Field of Search ................ 219/10.55 B, 10.55 R, 219/10.55 E, 10.55 D, 516; 338/28, 29, 30; 374/149, 164, 165, 208, 209; 340/596; 99/421 TP; 324/65 R, 65 P

[56] References Cited

U.S. PATENT DOCUMENTS

| | | | |
|---|---|---|---|
| 2,753,714 | 7/1956 | Perkins et al. | 338/30 |
| 2,839,594 | 6/1958 | Schneidersmann | 136/4 |
| 3,412,359 | 11/1968 | Schwyn et al. | 338/30 |
| 3,570,312 | 3/1971 | Kreith | 73/345 |
| 3,723,935 | 3/1973 | Frazier et al. | 338/28 |
| 3,929,018 | 12/1975 | Turner | 338/28 X |
| 3,999,434 | 12/1976 | Yen | 338/28 X |
| 4,035,787 | 12/1977 | Hornung | 340/228 |
| 4,058,014 | 11/1977 | Durand | 338/28 X |
| 4,088,863 | 5/1978 | Jellies | 219/10.55 E |
| 4,122,322 | 10/1978 | Ohkubo et al. | 219/10.55 R |
| 4,186,368 | 1/1980 | White et al. | 338/28 |

FOREIGN PATENT DOCUMENTS

| | | |
|---|---|---|
| 2806193 | 8/1979 | Fed. Rep. of Germany . |
| 1314459 | 12/1962 | France . |
| 2329013 | 5/1977 | France . |

OTHER PUBLICATIONS

Karbe "Semiconductor Surface Thermometer" Instrument Construction No. 7, Jul. 1964, p. 27, fourth paragraph.

Primary Examiner—Philip H. Leung
Attorney, Agent, or Firm—Charles E. Brown; Charles A. Brown

[57] ABSTRACT

A heat sensor adapted to be brought into contact at a forward end with a product heated in a microwave oven whose temperature is to be measured comprises an elongate tubular body consisting a protective armor. This body is open at the forward end. A thermally conductive pad is disposed in the body at its open forward end and projects from the body. A heat-sensitive electrical component is incorporated in the pad. A cable extending along the inside of the body connects this component to a temperature measurement electrical circuit. The open forward end of the body and the pad contact the product conjointly.

14 Claims, 2 Drawing Figures

HEAT SENSOR FOR MEASURING THE TEMPERATURE OF A PRODUCT HEATED IN A MICROWAVE OVEN

BACKGROUND OF THE INVENTION

1. Field of the Invention

The present invention relates to a heat sensor for measuring the temperature of a product heated in a microwave oven, comprising an elongate tubular body forming a protective armor, said body being adapted to pass through the wall of the oven so that its forward end reaches the product whose temperature is to be measured, and a heat-sensitive electrical component disposed at the forward end of the body and adapted to be connected to a temperature measurement electrical circuit by a cable which extends along the inside of the body.

The heat-sensitive electrical component may consist, for example, of a thermistor or a thermocouple the resistance of which varies as a function of temperature and which therefore influences the measurement circuit in such a way that it may be calibrated.

This measurement electrical circuit may naturally be adapted to interrupt heating automatically when the heat treatment of the product reaches the required extent.

2. Description of the Prior Art

Generally speaking, heat sensors proposed until now feature at the forward end of the body an extension of the armor, of pointed shape, adapted to penetrate into the product, the more or less soft consistency of which lends itself to such penetration, but this does not permit precise measurement of the temperature by simple contact with the outside surface of a product having a rigid consistency which would make it difficult or impossible for the sensor to penetrate to the interior of the product.

Also, known sensors have the disadvantage of not reacting sufficiently rapidly when the temperature of a heated body varies suddenly.

An object of the present invention is a heat sensor for measuring the temperature of a product heated in a microwave oven which provides on the one hand for the precise measurement of temperature, using a sensor which is operative through simple contact with the surface of this product, and on the other hand for quick reaction to any variation in temperature.

SUMMARY OF THE INVENTION

The invention consists in a heat sensor of the type adapted to be brought into contact at a forward end with a product heated in a microwave oven whose temperature is to be measured, comprising an elongate tubular body forming a protective armor and open at said forward end, a thermally conductive pad disposed in said body at said open forward end and adapted to project from said body, a heat-sensitive electrical component incorporated in said pad, and a cable extending along the inside of said body and adapted to connect said component to a temperature measurement electrical circuit.

Unlike previously proposed arrangements, in which the armor is uninterrupted, even at the forward end of the body, in this instance the armor is deliberately eliminated at the forward end of the body, which could give rise to fears of disturbing electromagnetic influences at the level of the pad incorporating the heat-sensitive electrical component.

With the arrangement in accordance with the invention, such disturbance does not occur and to the contrary the user benefits from conditions in which the temperature measurement is perfectly exact and precise.

Experience has shown that the cross-section of the open forward end of the body where the pad is disposed must be sufficiently small but can nevertheless be relatively large in relation to the wavelength of the microwaves. For example, the open forward end gives good results with a diameter of approximately 20 mm for microwaves at 2.45 GHz.

The advantages of an opening of this kind in the armor at the forward end of the sensor are considerable. The temperature is sensed directly and there is therefore no distortion such as could result from the presence of a jacket at the point where the temperature is meaured. The material from which the pad is fabricated may be chosen to have a high thermal conductivity, independently of the choice of the armor material.

The pad may be of silver or aluminum, for example, whereas the body is of stainless steel.

As a safety measure, the open forward end of the body should have as small as possible a free cross-section and, in accordance with another characteristic of the invention, this open forward end of the body is defined by a ring which projects radially inwards as far as the vicinity of the outside contour of the pad.

In accordance with another characteristic of the invention, and in order to protect the pad as much as possible, the open forward end of the body and the pad are brought conjointly into contact with the product whose temperature is to be measured.

In this way, when the temperature is measured, the pad is as it were enclosed by the product itself and by the end of the body.

An arrangement of this kind provides in particular for extremely precise measurement of temperature.

The open forward end of the body of course touches the product whose temperature is to be measured and can therefore, to some extent, become heated even if its thermal conductivity is chosen as low as possible, with the risk of introducing some distortion into the measurement of the temperature by the pad.

In order to minimize any such distortion as much as possible, and in accordance with another characteristic of the invention, the open forward end of the body is annular and has a transverse cross-section which progressively decreases in the forward direction so as to define a substantially linear area of contact with the product whose temperature is to be measured, having a half-torus shape profile, for example. Thus, although the open forward end of the body is in contact with the product, this contact is over a limited surface area since it is substantially linear. In this way, if the contact of the body with the product introduces any distortion, the latter is as low as possible.

In accordance with another characteristic, the body comprises two telescoping parts one inside the other, the inside part projecting forwardly, and the sensor further comprises spring means bearing on the outside part and adapted to urge the inside part forwardly, the pad being disposed at the forward end of the inside part, whereas the outside part is adapted to pass through the wall of the oven.

Using this arrangement, the open forward end of the body contacts the product whose temperature is to be measured in a particularly stable and effective manner due to the action of these elastic means.

Also, an arrangement of this kind enables the sensor to be used to measure the temperature of products at different distances from the wall of the oven.

In accordance with another characteristic, the sensor further comprises an insulative plunger slidably disposed within the body, an abutment member on the body and elastic means adapted to urge the plunger forwards into contact with the abutment member, in which position the pad projects beyond the open forward end of the body, whereby the pad is able to retract against the action of the elastic means when brought into contact with the product until the open forward end of the body also contacts the product.

Because of this arrangement the pad is held in contact with the product by virtue of a calibrated spring force, which provides for extremely precise measurement conditions. Also, the conditions of contact between the product and the pad and the open end of the body are excellent, even if the product has an irregular surface.

In one embodiment, the abutment member on the body with which the insulative plunger cooperates is formed by a ring which defines the open forward end of the body and projects radially inwards. In this way the structure of the sensor is particularly simple.

The insulative plunger is advantageously fabricated from alumina or glass.

The body is preferably adapted to pass through the wall of the oven by means of an electrically conductive ring.

Other objects and advantages will appear from the following description of an example of the invention, when considered in connection with the accompanying drawing, and the novel features will be particularly pointed out in the appended claims.

DESCRIPTION OF THE PREFERRED EMBODIMENT

Figure 1:
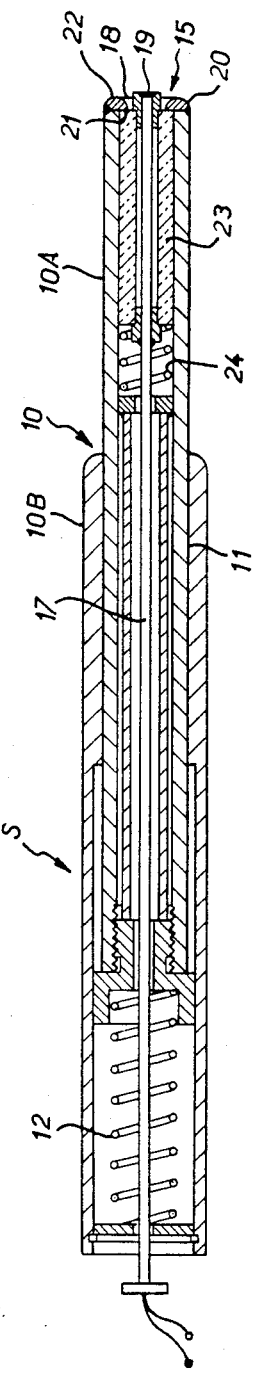
FIG. 1 is a view in longitudinal cross-section of a heat sensor in accordance with the invention, shown in isolation.
Figure 2:
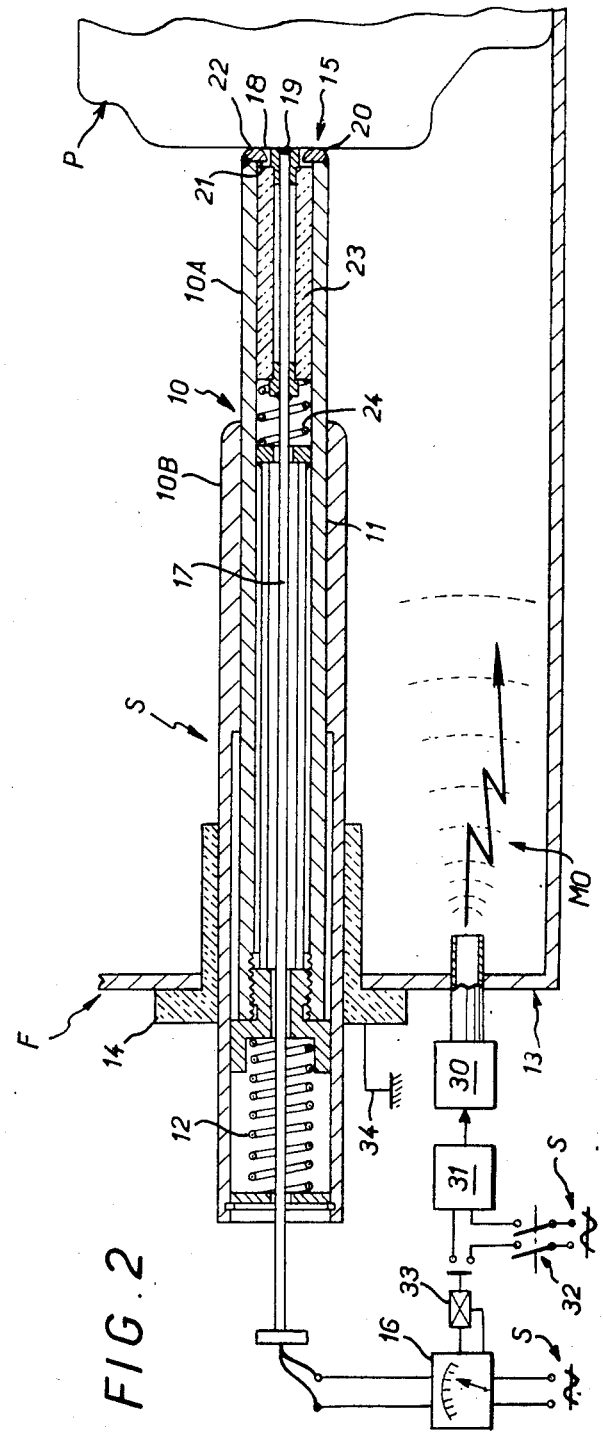
FIG. 2 is a view analogous to FIG. 1 but in which the sensor is operative in a microwave oven and in contact with a product whose temperature is to be measured.

In the embodiment shown by way of example in FIGS. 1 and 2, a heat sensor S for measuring the temperature of a product P heated in a microwave oven F comprises an elongate tubular body 10 forming a protective armor.

The body 10 is fabricated from stainless steel.

In the example shown in FIGS. 1 and 2, the body 10 is in two tubular parts 10A and 10B telescoping at 11, the first 10A inside the second 10B. The first part 10A projects forwardly and is urged forwardly by elastic means consisting of a spring 12 bearing on the second part 10B. The second part 10B is adapted to pass through the wall 13 of the oven F by means of a conductive metal ring 14 which is electrically earthed at 34.

As seen in FIG. 2, the body 10 which is thus adapted to pass through the wall 13 of the oven F reaches at its forward end the product P whose temperature is to be measured.

The heat sensor further comprises a heat-sensitive electrical component 13, in this instance a thermocouple, disposed at the forward end of the part 10A of the body 10 and adapted to be connected to a temperature measurement electrical circuit 16 by means of a cable 17 which extends along the inside of the body 10. A magnetron 30 generating microwaves MO is supplied by a high-tension power supply module 31 itself supplied from a mains supply S via a switch 32 and a relay 33 controlled by the measurement circuit 16.

The part 10A of the body 10 has an open forward end 18. The heat-sensitive electrical component 15 is incorporated into a thermally conductive pad 19 which is disposed in the part 10A of the body 10 at its open forward end 18 and which is adapted to extend outside the body 10, through this open forward end 18, to contact directly the product P whose temperature is to be measured.

The cross-sectional area of the opening in the open forward end 18 of the part 10A of the body 10 in which the pad 19 is disposed is sufficiently small, for example 20 mm in diameter when using microwaves at 2.45 GHz.

The open forward end 18 of the part 10A of the body 10 consists of a ring 20 projecting radially at 21 towards the interior of the part 10A of the body 10, as far as the vicinity of the outside contour of the pad 19.

The ring 20 has a profile the transverse cross-section of which is progressively reduced in the forward direction, producing a half-torus shape profile, for example, so as to define a substantially linear area of contact 22 with the product P.

This area 22 of the forward end of the body 10 and the pad 19 are adapted to contact the product P conjointly.

Specifically, the pad 19 is disposed at the forward end of an insulative plunger 23. This insulative plunger is fabricated from alumina or glass.

The insulative plunger 23 is slidably disposed in the part 10A of the body 10 and is urged forwardly by a contact spring 24 into a position (FIG. 1) defined by the radially projecting part 21 of the ring, which forms an abutment member. In this position, the pad 19 projects slightly beyond the contact area 22, as seen in FIG. 1. The pad 19 is able to retract against the action of the spring 24 until it is flush with the area 22, as seen in FIG. 2, when the forward end of the part 10A of the body 10 and the pad 19 are brought conjointly into contact with the product P.

To measure the temperature of the product P in the microwave oven F, the protective body 10 has its part 10B inserted into the conductive ring 14. The spring 12 pushes the part 10A into contact at 22 against the product P, whereas the spring 24 urges the pad 19 into contact with the product P. Note that the telescopic assembly at 11 of the parts 10A and 10B and the spring 12 provide for measuring the temperature of various products at different distances from the wall 13 of the oven F.

In the position shown in FIG. 2, the ring 20 protects the pad 19, although it is in only limited contact with the product P at 22, which avoids falsifying the measurement.

The temperature of the product P as sensed by the heat-sensitive component 15 incorporated into the pad 19 is represented by the value of the electrical current generated by this component 15 which determines the state of the measurement electrical circuit 16 to which the component 15 is connected by the cable 17, which enables the temperature of the product P to be measured. Also, the relay 33 provides for automatically switching off the magnetron 30 generating the heating microwaves MO when the measured temperature reaches a required value, through the intermediary of the high-tension supply module 31.

It will be understood that the heat sensor in accordance with the invention provides for measuring the temperature of all forms of product P, however soft, and in particular rigid products penetration of which would be difficult or impossible, in a precise manner and by simple contact therewith.

It will be understood that various changes in the details, materials and arrangements of parts which have been herein described and illustrated in order to explain the nature of the invention may be made by those skilled in the art within the principle and scope of the invention as expressed in the appended claims.

For example, the heat-sensitive component 15 may be a thermistor.

There is claimed:

1. Heat sensor of the type adapted to be brought into contact with a product being heated in a microwave oven the temperature of which product is to be measured, said heat sensor comprising an elongate tubular body defining a protective armor and being open at a forawrd end, the forward end of said tubular body carrying a separately formed product engageable ring, said ring protruding radially inwardly of said body to reduce the size of the opening of said body forward end, a thermally conductive product engageable pad disposed in said body at said open forward end and facing axially outwardly at the open end of said body, a clearance being formed between said pad and ring, a heat-sensitve electrical component incorporated in said pad, and a cable extending along the inside of said body for connecting said component to a temperature measurement electrical circuit.

2. Heat sensor according to claim 1, wherein the clearance in said open forward end of said body is appropriately small, for example the diameter of the open forward end defined by said ring being 20 mm when using microwaves at 2.45 GHz.

3. Heat sensor according to claim 1, wherein said ring extends radially inwardly towards the outside contour of said pad, said clearance being annular and defined therebetween.

4. Heat sensor according to claim 1, wherein said open forward end of said body is annular and said ring has a transverse cross-section which progressively decreases in the forward direction so as to define a substantially linear, annular zone of contact with the product.

5. Heat sensor according to claim 4, wherein said ring is of half-torus shape having a curved side for engagement with the product.

6. Heat sensor according to claim 1, wherein said body comprises two telescoping parts one inside the other, the inside part projecting forwardly, and further comprising spring means bearing on the outside part for urging said inside part forwardly, said pad being disposed at the forward end of said inside part.

7. Heat sensor according to claim 6, wherein said body is of low thermal conductivity material and said pad is of high thermal conductivity material.

8. Heat sensor according to claim 7, wherein said body is fabricated from stainless steel.

9. Heat sensor according to claim 7, wherein said pad is fabricated from silver or aluminum.

10. Heat sensor according to claim 1, further comprising an insulative plunger slidably disposed within said body, said pad being disposed at the forward end of said plunger, an abutment on said body formed by said ring and elastic means for urging said plunger forwardly into contact with said abutment, in which position said pad projects beyond said ring, whereby said pad is able to retract against the action of said elastic means when brought into contact with a product until said ring also contacts said product.

11. Heat sensor according to claim 10, wherein said plunger is fabricated from alumina or glass.

12. Heat sensor according to claim 1, further comprising a conductive ring whereby said sensor is adapted to be passed through the wall of said microwave oven.

13. Heat sensor according to claim 1, wherein said pad is sufficiently small not to be effected by electromagnetic influences.

14. Heat sensor according to claim 1, wherein said heat sensor comprising means mounting said pad to protrude beyond the end of the body.

* * * * *